Patented July 25, 1944

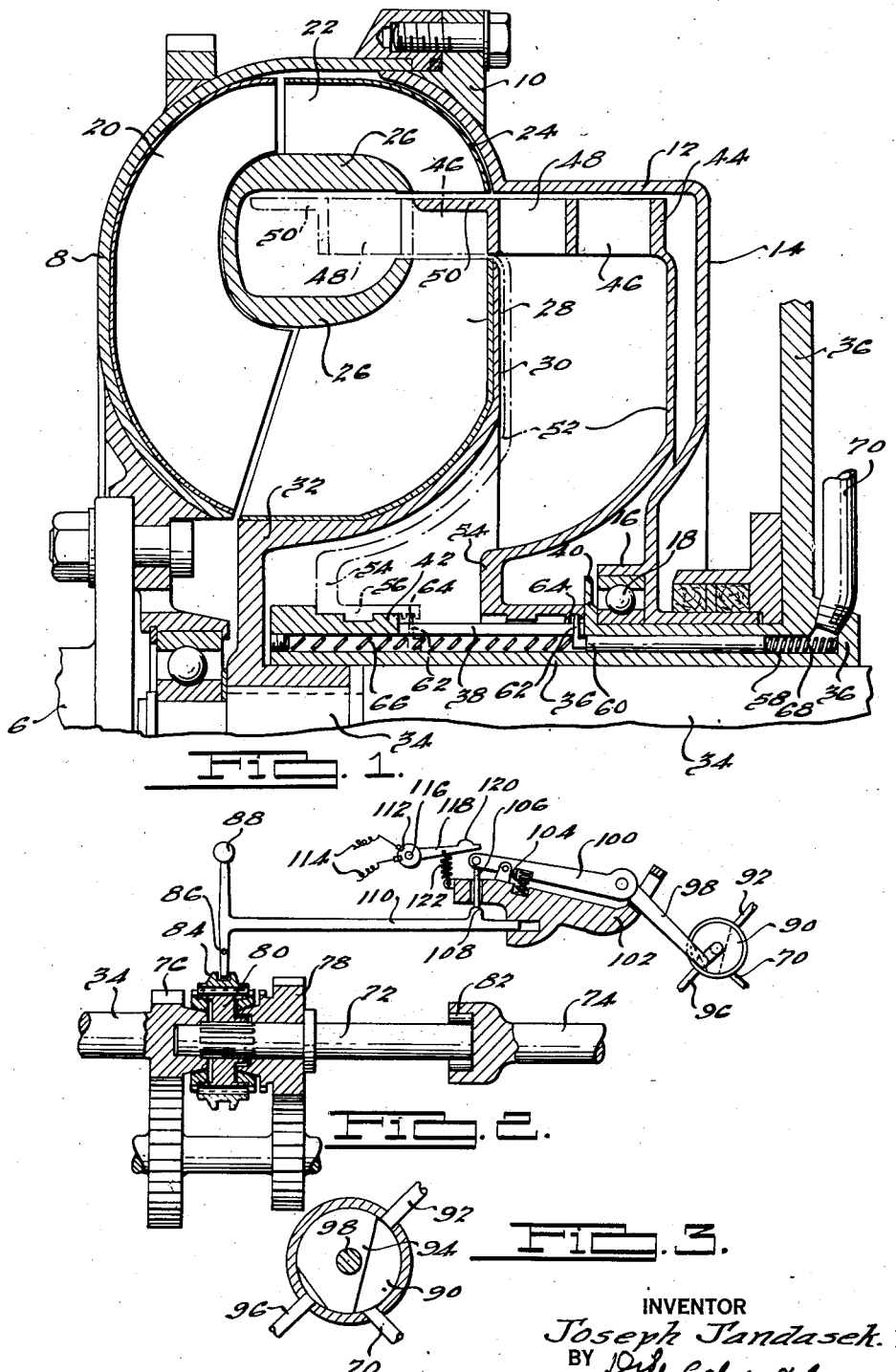

2,354,596

UNITED STATES PATENT OFFICE 2,354,596

TURBOTRANSMISSION

Joseph Jandasek, Detroit, Mich., assignor to Bendix Aviation Corporation, South Bend, Ind., a corporation of Delaware Application November 25, 1940, Serial No. 366,948

8 Claims. (Cl. 74—189.5)

This invention relates to transmissions and more particularly to hydraulic transmissions adapted to selectively operate as torque converters or as fluid clutches and wherein automatic or manual means are employed to control the operation of the transmission.

An object of this invention is to facilitate shifting operations to vary the torque transmitting ratio of a transmission by simultaneously interrupting the power and driven members from the speed varying mechanism at the instant it is desired to vary the speed ratio.

Another object resides in the provision of speed varying means interposed between driving and driven members wherein automatically operable means are provided to isolate the speed varying means from the driving and driven members at the instant it is desired to make a change of the speed ratio.

A further object of this invention is to provide means to render a torque converter inoperative when the speed of operation of the device approaches a substantially predetermined minimum value.

Another object of the invention is to provide torque responsive means for interrupting the transmission of power through a fluid transmission when the torque transmitted decreases to a substantially predetermined point.

Yet another object resides in the provision of means responsive to a gear shifting movement to interrupt the operation of the engine or prime mover at the moment of operation of a speed varying mechanism.

Another object of the invention is to momentarily isolate a speed varying mechanism in such a manner that the speed varying mechanism may be actuated with minimum danger of clashing of gears.

Still another object is to provide means responsive to variations in manifold vacuum for momentarily interrupting the fluid circuit of a torque converter to facilitate actuation of speed varying means associated with the device.

Yet another object of the invention is to provide manifold vacuum responsive means to actuate a shiftable guide wheel member to a position to interrupt the operation of the device when the differential of fluid pressure in the manifold approaches a substantially predetermined value.

A still further object resides in the provision of a shiftable guide wheel member which may move axially on a helix to two operative positions to operate a turbounit as a torque converter or as a fluid clutch, and which may be shifted axially by power means to a position to interrupt the operation of the device.

Another object is to provide speed varying means associated with a fluid transmission wherein means are provided to momentarily render the prime mover inoperative and relieve a driven shaft of load to facilitate actuation of the speed varying means.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view of a device embodying the present invention.

Fig. 2 is a diagrammatic view illustrating the control mechanism.

Fig. 3 is an enlarged view of a valve mechanism.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Fig. 1, it will be observed that a driving shaft 6 is provided with an impeller housing 8 which receives a cover plate 10 having an axially extending housing portion 12 terminating in a radially extending flange 14 having an axially extending portion 16 mounted on suitable bearings 18.

The impeller housing 8 is provided with impeller vanes 20 suitably secured thereto and positioned to impart energy to a liquid circulating within the housing. The energy is transmitted to a turbine having first stage turbine vanes 22 interposed between a turbine web 24 and a turbine shroud 26, and to second stage turbine vanes 28 interposed between the shroud 26 and a turbine web 30. The turbine web 30 is carried by a turbine hub 32 operably connected to a driven shaft 34 which may be coaxially aligned with the driving shaft 6.

A stationary sleeve 36 is preferably concentrically mounted relative to the driven shaft 34 and is provided with a plurality of spaced longitudinally extending slots 38 extending between a flange 40 and a helically threaded portion 42.

A guide wheel 44 provided with a plurality of spaced channels 46 and 48, and a closing valve 50 is axially movable into and out of the fluid circuit preferably between the first and second stage turbines. The channel 46 of the guide wheel member 44 is provided with vanes disposed at suitable angles to operate the device as a torque converter, and the channel 48 is provided with vanes of suitable contour to operate the device as a turboclutch. The closing valve 50 may be introduced into the fluid circuit to substantially close the circuit thereby rendering the unit inoperative.

The guide wheel 44 is mounted on a radially extending guide wheel flange 52 carried by a guide wheel hub 54 having internal helically threaded portions 56 cooperating with the helically threaded portion 42 of the stationary member 36 to move the guide wheel axially into or out of the fluid circuit to operate the device as a torque converter or as a turboclutch or to render the unit inoperative.

The stationary member 36 is provided with a plurality of spaced axially extending cylinders 58 adapted to receive plungers 60 having actuating fingers 62 positioned to engage in a circumferential groove 64 formed in the guide wheel hub 54. The fingers 62 are aligned in the slots 38 to move axially therein when the pistons 60 are moved longitudinally in the cylinders 38 to actuate the guide wheel structure.

Suitable resilient means such for example as spaced oppositely directed springs 66 and 68 may be positioned in the cylinder 58 to engage the pistons 60 to urge the pistons to move the guide wheel out of and into the fluid circuit respectively. The springs 66 and 68 may be calibrated to exert a force urging the guide wheel out of the fluid circuit when it is fully in and to exert a force urging the guide wheel into the circuit as it approaches the retracted position. The cylinders 58 may be operably connected by means of a suitable conduit 70 with torque responsive means such for example as the intake manifold of an engine or prime mover.

Referring now to Fig. 2 of the drawing, it will be observed that the driven shaft 34 may be operably connected through an intermediate shaft 72 with a final driven shaft 74.

The driven shaft 34 may be provided with a pinion 76 and the intermediate shaft 72 may be provided with a second speed gear 78 suitably interconnected by speed varying synchromesh operated gearing 80. The intermediate shaft 72 and the final driven shaft 74 may be interconnected by one-way driving means 82 whereby power may be transmitted to the final driven shaft 74 in one direction of rotation only.

The speed varying gearing 80 may be actuated by means of a sleeve 84 axially movable by means of a suitable control member 86 having a handle 88. The control member 86 may be actuated automatically by any suitable shifting mechanism controlled by speed or torque responsive means or may be actuated manually by the handle 88.

The guide wheel 44 may be operated by torque responsive means such for example as intake manifold vacuum in such a manner that the closing valve member 50 will be interposed in the fluid circuit to close the fluid circuit thereby rendering the torque converter inoperative at the time the sleeve 84 is actuated to vary the power transmitting ratio of the transmission. The guide wheel member may, if desired, be operably interconnected with the shifting mechanism in such a manner as to introduce the closing valve member 50 into the fluid circuit when the sleeve 84 approaches the neutral position illustrated in Fig. 2.

The conduit 70 illustrated in Fig. 1 may communicate with a valve chamber 90 having a conduit 92 communicating with the intake manifold of the engine or other suitable source of variable fluid pressure. A valve disk 94 may be positioned in the valve chamber 90 to selectively interconnect the conduit 70 with the conduit 92 communicating with the source of variable fluid pressure or with a conduit 96 communicating with atmospheric pressure.

The disk 94 may be actuated by means of a shaft 98 operably connected to a lever 100 journalled in a stationary member 102. Yielding means such for example as a spring 104 may be provided to resiliently urge the lever 100 toward the inoperative position to interconnect the conduit 70 with the atmospheric conduit 96. A plunger 106 carried by the lever 100 is provided to engage a cam portion 108 carried by a shift bar 110 operably connected to the control member 86.

Means may be provided to intermittently interrupt the transmission of power from the ingine or prime mover at the time it is desired to effect a change in speed ratio. One suitable form of mechanism for interrupting the power transmitted comprises a rotatable member 112 positioned in the ignition circuit 114 and provided with suitable segmental contacts to intermittently interconnect or disconnect the ignition circuit as the member 112 oscillates slightly on a shaft 116. The rotatable member 112 may be oscillated on the shaft 116 to interrupt the ignition circuit 114 by means of a lever 118 positioned to be engaged by the lever 100 when the plunger 106 is actuated by the cam 108 upon movement of the control member 86. A suitable weight 120 may be carried by the lever 118 to build up an inertia force to momentarily interrupt the ignition circuit 114 when the control member 86 is actuated rapidly to cause the cam 108 to strike the plunger 106 and force the lever 100 upwardly. The lever 118 will then be thrown upwardly by the inertia force to oscillate the rotatable member 112 on the shaft 116 and momentarily interrupt the ignition circuit 114. The length of time the ignition circuit 114 is thus interrupted may be varied by changing the intensity of the weight 120, a spring 122 being provided to return the lever 118 to the operative or ignition closed position.

The operation of this device is as follows: When the control member 86 is in the neutral position as illustrated in Fig. 2, the conduit 70 is interconnected with the conduit 92 communicating with the intake manifold of the engine. The plungers 60 are then subjected to manifold vacuum to urge the guide wheel hub 54 and the guide wheel 44 to move axially to the position illustrated in full lines whereupon the valve 50 closes the fluid circuit between the first and second stage turbine members to interrupt the transmission of power through the turbounit.

The free wheel unit 82 interposed between the intermediate driven shaft 72 and the final driven shaft 74 transmits power in one direction of rotation only. The control member 86 may therefore be readily shifted because as the sleeve 84 approaches the neutral position illustrated in Fig. 2, the load on the driven shaft 34 is released and the final driven shaft 74 will tend to overrun the speed of the intermediate driven shaft 72 thereby unloading the change speed gearing 80 to permit ready shifting of the gears.

If it is desired to make a rapid shift of the gears by quickly manipulating the control member 86, the cam 108 strikes the end of the plunger 106 carried by the lever 100 to throw the lever upwardly about the shaft 98 whereupon the lever 118 controlling the ignition circuit 114 will be oscillated upwardly about the shaft 116 to momentarily interrupt the ignition circuit. The weight 120 develops a predetermined degree of inertia dependent upon the rapidity with which the shifting operation is performed to vary the length of time the ignition circuit is interrupted to permit the shifting of the sleeve 84 into engagement with the desired gearing to effect the speed change.

When the sleeve 84 is in engagement with the desired gears 76 or 78, the cam 108 moves out of engagement with the end of the plunger 106 whereupon the shaft 98 is rotated to interconnect the conduit 70 with the atmospheric conduit 96 and the spring 122 returns the lever 118 to the normal position to interconnect the ignition circuit whereupon power can be transmitted from the driving shaft 6 to the final driven shaft 74.

When the valve disk 94 is thus rotated to interconnect the conduit 70 with the atmospheric conduit 96, the plungers 60 being subjected to substantially equal pressures on their opposite ends will be urged longitudinally in the cylinders 58 by the springs 68, and the fingers 62 engaging in the circumferential groove 64 will move the guide wheel hub 54 axially to position the channel 48 in the fluid circuit to operate the device as a fluid clutch.

Dependent on the fluid reaction exerted in the fluid circuit the guide wheel will shift axially to position the channel 46 or the channel 48 in the fluid circuit to selectively operate the device as a torque converter or as a fluid clutch.

Attention is called to the fact that if desired the control mechanism illustrated in Fig. 2 may be dispensed with entirely and the conduit 70 of Fig. 1 connected directly to the intake manifold of the engine. When the device is thus connected it will operate as follows: If the channel 46 of the guide wheel 44 is in the fluid circuit power will be transmitted as a torque converter. If the accelerator is released to reduce the torque transmitted to the device, the fluid reaction in the power transmitting circuit will decrease whereupon the helical threads 56 of the guide wheel hub 54 will rotate on the helical threads 42 of the stationary sleeve 36 to position the channel 48 in the fluid circuit to transform the device to operate as a turboclutch. If the accelerator pedal is still further released, such for example as to an idling speed, the vacuum in the intake manifold will increase and exert suction in the conduit 70 and cylinders 58 to urge the guide wheel hub 54 axially toward the right as viewed in Fig. 1 toward the full line position to interpose the closing valve 50 in the fluid circuit to stop circulation of fluid in the device thereby interrupting the transmission of power and preventing what has commonly been referred to in this art as "creep."

This is a continuation-in-part of my co-pending application Serial No. 588,163, filed January 22, 1932.

I claim:

1. In a transmission device for an engine having an ignition circuit, impeller and turbine members cooperating to form a power transmitting fluid circuit, valve means to interrupt the fluid circuit, a mechanical speed change gearing, and inertia means operated by manipulation of the speed change gearing to momentarily interrupt the ignition circuit and to actuate the valve means to interrupt the fluid circuit.

2. In a transmission for an engine having an ignition circuit, impeller and turbine members cooperating to form a power transmitting fluid circuit, guide wheel means selectively movable relative to the fluid circuit to operate the transmission as a torque converter or as a turboclutch or to interrupt the operation of the transmission, and means operated when the guide wheel interrupts the operation of the transmission to interrupt the ignition circuit.

3. In a transmission device for an engine propelled motor vehicle, a turbounit having impeller and turbine wheels cooperating to form a fluid circuit, a guide wheel having a plurality of spaced channels adapted to be selectively positioned in the fluid circuit to operate the device as a torque converter or as a turboclutch, valve means carried by the guide wheel to close the fluid circuit, mechanical speed change gearing associated with the turbounit, fluid pressure responsive means controlled by actuation of the change speed gearing to introduce the valve means into the fluid circuit to interrupt the operation of the turbounit upon actuation of the speed change gearing, and inertia means to interrupt the engine power when the valve means is in the fluid circuit.

4. A power transmitter comprising cooperating turbo and mechanical gearing for an engine having an ignition circuit, manually operable means to actuate the change speed gearing, valve means controlling the turbounit, means actuated by movement of the speed change gearing to render the turbounit inoperative, and inertia means actuated by the manual operation of the change speed gearing to momentarily interrupt the ignition circuit of the engine.

5. In a transmission device for an engine propelled motor vehicle having an ignition circuit, a turbounit having impeller and turbine wheels cooperating to form a fluid circuit, a guide wheel having a plurality of spaced channels adapted to be selectively positioned in the fluid circuit to operate the device as a torque converter or as a turboclutch, valve means carried by the guide wheel to close the fluid circuit, mechanical speed change gearing associated with the turbounit, inertia means to momentarily interrupt the operation of the engine ignition circuit, and means to simultaneously move the valve means to close the fluid circuit upon actuation of the change speed gearing.

6. A power transmitter comprising cooperating turbo and mechanical units for an engine having an ignition circuit, manually operable means to vary the gear ratio of the mechanical unit and including a neutral position, means to render the turbounit inoperative when the manually operable means is in the neutral position, and means operated by a rapid manipulation only of the manually operable means to momentarily interrupt the ignition circuit and render the engine inoperative.

7. A power transmitter comprising cooperating turbo and change speed mechanical gearing for an engine having an ignition circuit, manually operable means to actuate the change speed gearing, valve means controlling the turbounit, means actuated by shifting movement of the speed change gearing to render the turbounit inoperative, and means actuated by a rapid actuation only of said manually operable means to momentarily interrupt the ignition circuit of the engine.

8. A power transmitter for a motor vehicle having an ignition controlled engine comprising a fluid transmission, a mechanical speed change transmission, a final driven shaft, manually operated means to actuate the mechanical transmission, inertia controlled means to interrupt the engine ignition circuit upon predetermined movement of the manually operated means, and one-way driving means between the mechanical speed change transmission and the final driven shaft to interrupt the driving connection between the mechanical transmission and the final driven shaft to facilitate shifting.

JOSEPH JANDASEK.